United States Patent

Murray

[15] 3,656,007

[45] Apr. 11, 1972

[54] VOLTAGE DEPENDENT PHASE SWITCH

[72] Inventor: Raymond P. Murray, 28 Sierra Vista Drive, Monterey, Calif. 93940

[22] Filed: Sept. 25, 1970

[21] Appl. No.: 75,522

[52] U.S. Cl. .............................307/262, 307/318, 307/214, 307/242

[51] Int. Cl. ..........................................................H03k 1/12

[58] Field of Search ..........................307/318, 262, 214, 242

[56] References Cited

UNITED STATES PATENTS

| | | | |
|---|---|---|---|
| 3,553,487 | 1/1971 | Freeborn | 307/318 |
| 3,041,469 | 6/1962 | Ross | 307/235 |
| 3,202,904 | 8/1965 | Madland | 307/318 |
| 3,244,910 | 4/1966 | Leifer | 307/318 |

*Primary Examiner*—Stanley D. Miller, Jr.
*Assistant Examiner*—Harold A. Dixon
*Attorney*—R. S. Sciascia and Charles D. B. Curry

[57] ABSTRACT

A voltage dependent phase switch comprising a pair of transistors and a zener diode. An input signal is connected in series through the zener diode to drive the base of one of the transistors. The input signal is also connected to the base drive of an emitter follower transistor. When the input signal is negative and less in magnitude than the breakdown voltage of the zener diode then the emitter follower transistor is driven and an output signal is provided therefrom that increases linearly with increase in the input signal. However, when the input signal is negative and greater in magnitude than zener diode breakdown voltage then the transistor that is connected to the zener diode is driven and the voltage output decreases linearly with the increasing negative input voltage thereby providing a voltage dependent phase switch. In another embodiment of the invention an input signal circuit is provided which includes a DC source, a pulse generator and a sinusoidal signal generator wherein the currents are additive and provide a switching function in conjunction with the voltage dependent phase switch where the output sinusoidal signal is in-phase or 180° out of phase with the sinusoidal signal generator signal depending upon the state of the pulse generator.

5 Claims, 3 Drawing Figures

INVENTOR.
RAYMOND P. MURRAY

BY [signature]

ATTORNEY

VOLTAGE DEPENDENT PHASE SWITCH

The invention described herein may be manufactured and used by or for the Government of the United States of America for governmental purposes without the payment of any royalties thereon or therefor.

The present invention relates to a phase switching device and more particularly to a voltage dependent phase switching device.

Various types of phase switch circuits have been employed in the past. However, one of the major difficulties encountered with these phase switch circuits has been due to their complexity which has resulted in reduced reliability. For example, the conventional balanced modulator type circuit requires a transformer or a double ended input signal and auxiliary circuitry such as a differential amplifier. The present invention overcomes this difficulty by providing a relatively simple and highly reliable voltage dependent phase switch that has only two transistors and a zener diode as the active elements.

Accordingly, an object of the present invention is to provide a voltage dependent phase switch that is relatively simple and highly reliable.

Briefly, the present invention comprises a pair of transistors and a zener diode as the active elements. A negative switching input signal is connected in series through the zener diode to drive the base of one of the transistors. The same switching input signal is also connected to the base drive of an emitter follower transistor. When the input signal is below the breakdown voltage of the zener diode then the emitter follower transistor is driven and an output signal is provided therefrom that increases linearly with increasing input signal voltage. However, when the input signal exceeds the zener diode breakdown voltage then the transistor that is connected to the zener diode is driven and the voltage output decreases linearly with increasing input voltage thereby providing a voltage dependent phase switch. In another embodiment of the invention an input signal circuit is provided which includes a DC source, a pulse generator and a sinusoidal signal generator wherein the currents are additive and provide a switching function in conjunction with the voltage dependent phase switch where the sinusoidal output signal is in-phase or 180° out of phase with the sinusoidal signal generator signal depending upon the state of the pulse generator.

Other objects, advantages and novel features of the invention will become apparent from the following detailed description of the invention when considered in conjunction with the accompanying drawings wherein.

Obviously many modifications and variations of the present invention are possible in the light of the above teachings. It is therefore to be understood that within the scope of the appended claims the invention may be practiced otherwise than as specifically described.

Figure 1:
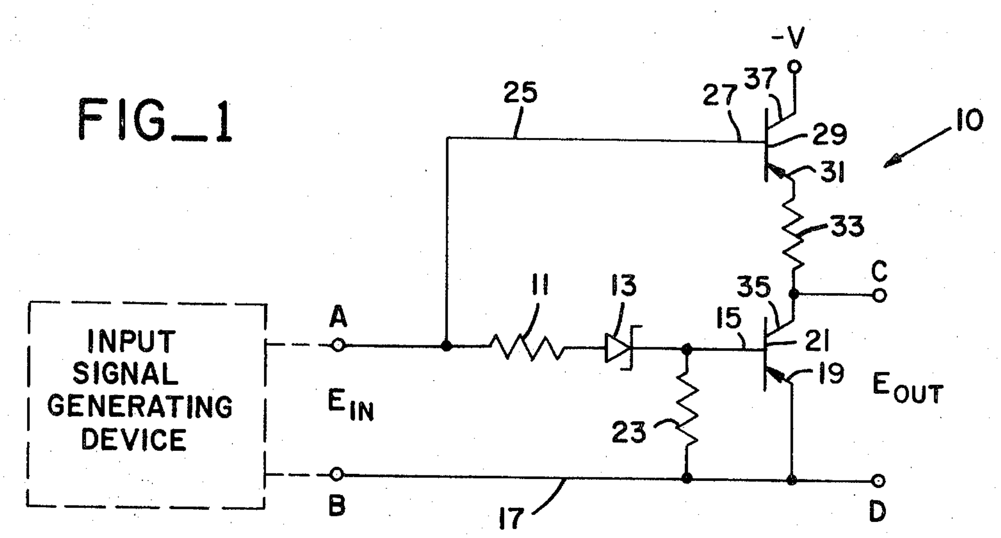
FIG. 1 is a schematic diagram of the voltage dependent phase switch of the present invention.

In FIG. 1 is illustrated the basic voltage dependent phase switch circuit of the present invention. The input signal $E_{in}$ is generated by an input signal generating device, shown in dotted lines. This input signal $E_{in}$ is applied to terminals A and B of the voltage dependent phase switch 10 of the present invention. The output signal $E_{out}$ of this circuit appears at terminals C and D. Terminal A is connected in series through resistor 11 and zener diode 13 to the base of transistor 15. Terminal B is connected to a common line 17, which may be ground, to emitter 19 of transistor 21 and to the output terminal D. Bias resistor 23 is connected between base 15 and common line 17 to establish the operating point of transistor 21.

Terminal A is also connected through lead line 25 to the base 27 of transistor 29. The emitter 31 of transistor 29, connected in the emitter follower configuration, is connected through resistor 33 to the collector 35 of transistor 21 and to the output terminal C. A negative power source (−V) is applied to the collector 37 of transistor 25. It is to be understood that the particular characteristics of transistors 21 and 25 and zener diode 13 may vary provided they are compatible with the hereinafter described circuit operation. For purpose of the following discussion the zener diode is assumed to have a breakdown voltage of about 10 volts; however, it is to be understood that the breakdown voltage may be substantially more or less than this value.

The operation of the FIG. 1 circuit will now be described with reference to the voltage diagram of FIG. 2. Assume that the input voltage $E_{in}$ is linearly increasing from zero volts to −10 volts. In this situation the output voltage will follow curve 41, which is linearly increasing with a linear increase in the input voltage $E_{in}$, because with the zener diode in the non-conducting state transistor 21 will also be nonconducting and the base 23 of emitter follower transistor 25 is driven into conduction by the increasing negative input voltage $E_{in}$ thereby providing the straight line curve 41.

Figure 2:
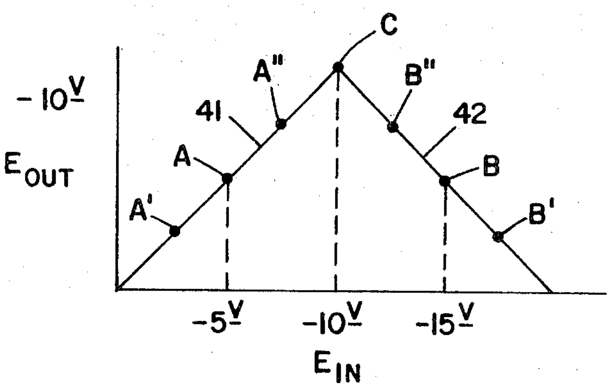
FIG. 2 is a diagram illustrating the operation of the phase switch of FIG. 1.

When the negative input voltage $E_{in}$ reaches the breakdown voltage of the zener diode 13, assumed to be −10 volts and occuring at point C of the FIG. 2 curve, then zener diode 13 becomes conducting. When this occurs the zener diode essentially acts as a constant 10 volt voltage source in opposition to the input voltage $E_{in}$. Therefore, with any increase of $E_{in}$ above this zener diode breakdown voltage of 10 volts there will be an increase in base current drive to transistor 21, which increases linearly with the input voltage $E_{in}$, in excess of −10 volts, and will thereby cause transistor 21 to conduct with the collector drawing an increasing amount of current resulting in a linearly decreasing collector voltage as illustrated by curve 42 of FIG. 2. The negative output voltage will approach zero when the negative input voltage $E_{in}$ reaches a value sufficient to saturate transistor 21.

From this it can be seen that the negative output voltage $E_{out}$ will linearly increase with the increase in negative input voltage $E_{in}$ until a predetermined voltage is reached, as set by the breakdown voltage of zener diode 13 (point C of FIG. 2), and the negative output voltage $E_{out}$ will then linearly decrease with further increase in the negative input voltage $E_{in}$.

Figure 3:
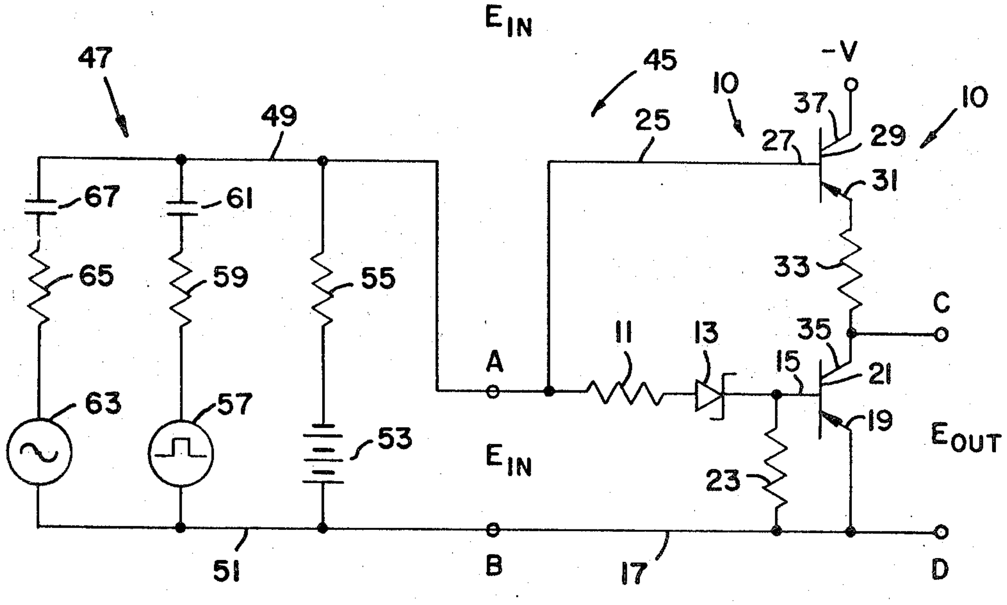
FIG. 3 is another embodiment of the present invention including the phase switch of FIG. 1 and input signal circuitry.

In FIG. 3 is illustrated another embodiment of the present invention wherein the voltage dependent phase switch of FIG. 1 is used as a biphase modulator 45 where the phase of the sinusoidal carrier is abruptly switched 180° by a pulse source which may be a digital modulating signal. This is particularly useful in PCM modulation wherein the pulse source shifts the operating point from point A to point B of FIG. 2 as will be hereinafter explained.

Referring to FIG. 3 like numerals refer to like elements of the FIG. 1 circuit. The biphase modulation circuit 45 of FIG. 3 includes the previously described voltage dependent phase switch circuit 10 and an input signal circuit 47. The input signal circuit 47 includes lead wire 49 connected to terminal A and lead wire 51 connected to terminal B. Battery 53 is connected in series through resistor 55 between lead wires 49 and 51. Pulse generator 57, load resistor 59 and blocking capacitor 61 are connected in series between lead wires 49 and 51. Also, sinusoidal signal generator 63, load resistor 65, and blocking capacitor 67 are connected in series between lead wire 49 and 51.

The operation of the FIG. 3 circuit will now be described in relation to the diagram of FIG. 2. The voltage of battery 53 is selected (for example, 5 volts) so that when there is no pulse from pulse generator 57 (that is, pulse generator 57 is at the zero voltage state) then battery 53 will establish an operating point at point A of curve 41 of FIG. 2. Assuming that signal generator 63 is producing a sinusoidal signal (of less than a 5 volt total swing, for example) then the output voltage $E_{out}$ will have a sinusoidal signal component that is in phase with the input sinusoidal signal from voltage generator 63 and will sinusoidally increase and decrease along curve 41 and on either side of point A as, for example, between A′ and A″. This inephase relationship between the signal of signal generator 63 and the output voltage $E_{out}$ is because the output voltage $E_{out}$ will increase with increase of the input voltage $E_{in}$ (the sum of the D.C. voltage from battery 53 and the sine voltage from signal generator 63) and decrease with a decrease of the input voltage $E_{in}$.

However, assume now that pulse generator 57 provides a negative pulse such that it adds to the effect of bias battery 53 so that the DC component of the input voltage, $E_{in}$, is −15 volts thereby switching the operating point from point A to point B of curve 42 of FIG. 2. In this situation the output voltage $E_{out}$ will have a sinusoidal signal component that is 180° out of phase with the input sinusoidal signal from generator 63. Again, assuming that signal generator 63 is providing a sinusoidal signal, that has a total swing of less than 5 volts, then the output voltage $E_{out}$ will comprise a sinusoidal signal that is 180° out of phase with the input sinusoidal signal from voltage generator 63 and will sinusoidally increase and decrease along curve 42 and on either side of point B as, for example, between points B′ and B″. However, in this situation the magnitude of the output voltage $E_{out}$ will decrease with an increase in the magnitude of the input voltage $E_{in}$, and increase with a decrease in the input voltage $E_{in}$. From this it can be seen that the biphase modulator circuit 45 of FIG. 3 provides an output signal $E_{out}$ that includes a sinusoidal signal that is in-phase with the sinusoidal signal of the signal generator 63 when the pulse of pulse generator 47 is at zero and the sinusoidal output signal $E_{out}$ is 180° out of phase with the sinusoidal signal of signal generator 63 when a suitable negative pulse is provided from pulse generator 57.

It will be obvious to one skilled in the art that certain modifications may be made to the present invention and still stay within the scope of the present invention. For example, the types of transistors may be changed, the assumed voltage values of zener diode 13, battery 53, pulse generator 57, and signal generator 63 may be changed in a manner consistent with the previously described circuit operation.

In reference to the curve of FIG. 2 it should be noted that it is idealized in that it shows perfect linearity and equal magnitude of slopes. This idealization neglects some of the small voltage drops in the circuit; however, it is sufficiently accurated for purpose of explanation. For example, a −5 volt $E_{in}$ at terminals A and B would actually give an output at terminals C and D that would be a little less than −5 volts due to several reasons, but mainly due to the forward voltage drop across the base-emitter terminals of transistor 29. For germanium transistors, this drop would be in the order of 0.2 volts, reducing the output voltage to about −4.8 volts. Thus, in the explanation of FIG. 3, the assigning of −5 volts to battery 53 and −10 volts to pulse generator 57 does not result in operating points at exactly A or B on the curve. Not only for the reason discussed above but additionally because of the voltage-divider effects of the resistors in the circuit.

In reference to FIG. 3 it is to be understood that battery 53, pulse generator 52, and sinusoidal signal generator 63 may be connected in series rather than in parallel. When connected in parallel the input signal circuit 47 comprises a current source whereas when connected in series it comprises a voltage source. In the FIG. 3 embodiment, sinusoidal signal generator 63 would normally be the carrier signal and pulse generator 57 would normally be a stream of digital data representing the information to be transmitted.

What is claimed is:

1. A phase switching device comprising:

a. an input signal generating means;

b. a first means for providing an output signal in response to the input signal from said input generating means that has an output voltage that increases linearly with increase in said input signal;

c. a second means for providing an output signal in response to the input signal from said input generating means that has an output voltage that decreases linearly with increase in said input signal;

d. third means for applying said input signal directly to said first means;

e. fourth means for preventing the application of said input signal to said second means when said input signal is below a predetermined input voltage level and allowing the application of said input signal to said second means when said input signal is above said predetermined voltage level; and f. said input signal generating means including a D.C. source, a pulse source, and a signal generator operatively connected in parallel.

2. The device of claim 1 wherein:

a. said D.C. source has a voltage level that is below said predetermined voltage level; and b. said pulse source provides a pulse varying from about zero volts to a voltage level that when added to the voltage level of said D.C. source exceeds said predetermined voltage level.

3. The device of claim 1 wherein:

a. said first and second means comprise first and second transistors;

b. said fourth means comprises a zener diode; and c. said first transistor is operatively connected in an emitter follower configuration.

4. The device of claim 3 including:

a. first and second output terminals;

b. the emitter of said first transistor being operatively connected to the collector of said second transistor and to one of said output terminals; and c. the emitter of said second transistor being operatively connected to said second output terminal.

5. The device of claim 4 including:

a. first and second input terminals to which said input signal is operatively connected;

b. said third means operatively connecting the base of said first transistor to said first input terminal;

c. the anode of said zener diode being operatively connected to said first input terminal; and d. said second input terminal being operatively connected to the emitter of said second transistor and to said second output terminal.

* * * * *